United States Patent [19]

Leslie et al.

[11] Patent Number: 5,115,951

[45] Date of Patent: May 26, 1992

[54] DISPENSING WAND AND COMBINATION OF DISPENSING WAND WITH CONTAINER

[75] Inventors: Stuart Leslie; Thomas B. Aldrich, III, both of New York, N.Y.

[73] Assignee: Sterling Drug, Inc., New York, N.Y.

[21] Appl. No.: 644,648

[22] Filed: Jan. 23, 1991

[51] Int. Cl.$^5$ .............................................. B67D 3/00
[52] U.S. Cl. ..................................... 222/533; 222/570; 222/538; 239/377; 239/566; 239/600
[58] Field of Search ............ 222/570, 479, 481, 481.5, 222/526, 533, 566, 567, 538; 239/374, 377, 566, 600

[56] References Cited

U.S. PATENT DOCUMENTS

| 668,956 | 2/1901 | Enyeart . | |
|---|---|---|---|
| 1,787,024 | 12/1930 | Sjöström | 239/566 X |
| 2,657,951 | 11/1953 | North, Jr. | 299/101 |
| 3,534,891 | 10/1970 | Bozich | 222/526 X |
| 3,650,440 | 3/1972 | Gerniak | 222/565 |
| 3,746,200 | 7/1973 | Flider | 215/10 |
| 3,834,594 | 9/1974 | Schiemann | 222/464 |
| 3,997,119 | 12/1976 | Oosterhof | 239/652 |
| 4,522,585 | 6/1985 | Martin | 239/566 X |

FOREIGN PATENT DOCUMENTS

| 53667 | 5/1912 | Austria | 239/377 |
|---|---|---|---|
| 1053852 | 3/1959 | Fed. Rep. of Germany | 239/377 |
| 2524424 | 10/1983 | France | 239/377 |

Primary Examiner—Kevin P. Shaver
Assistant Examiner—Gregory L. Huson
Attorney, Agent, or Firm—Millen, White & Zelano

[57] ABSTRACT

An L-shaped dispensing wand has one end fitted into an insert previously snap fitted into the neck of a container, such as a rectangular metal can. The wand has an array of holes along the top side thereof which face downward when the can is inverted to sprinkle the area beneath the can. Preferably, the L-shaped dispensing wand is made of two portions which are packaged side-by-side and retained on top of the can prior to sale of the can. The customer assembles the sections to form the L-shaped wand and inserts the wand into the insert within the can. The insert includes a plurality of vent holes therein, which allow air to enter the can and reduce the vacuum tending to occur in the can as the can drains.

20 Claims, 3 Drawing Sheets

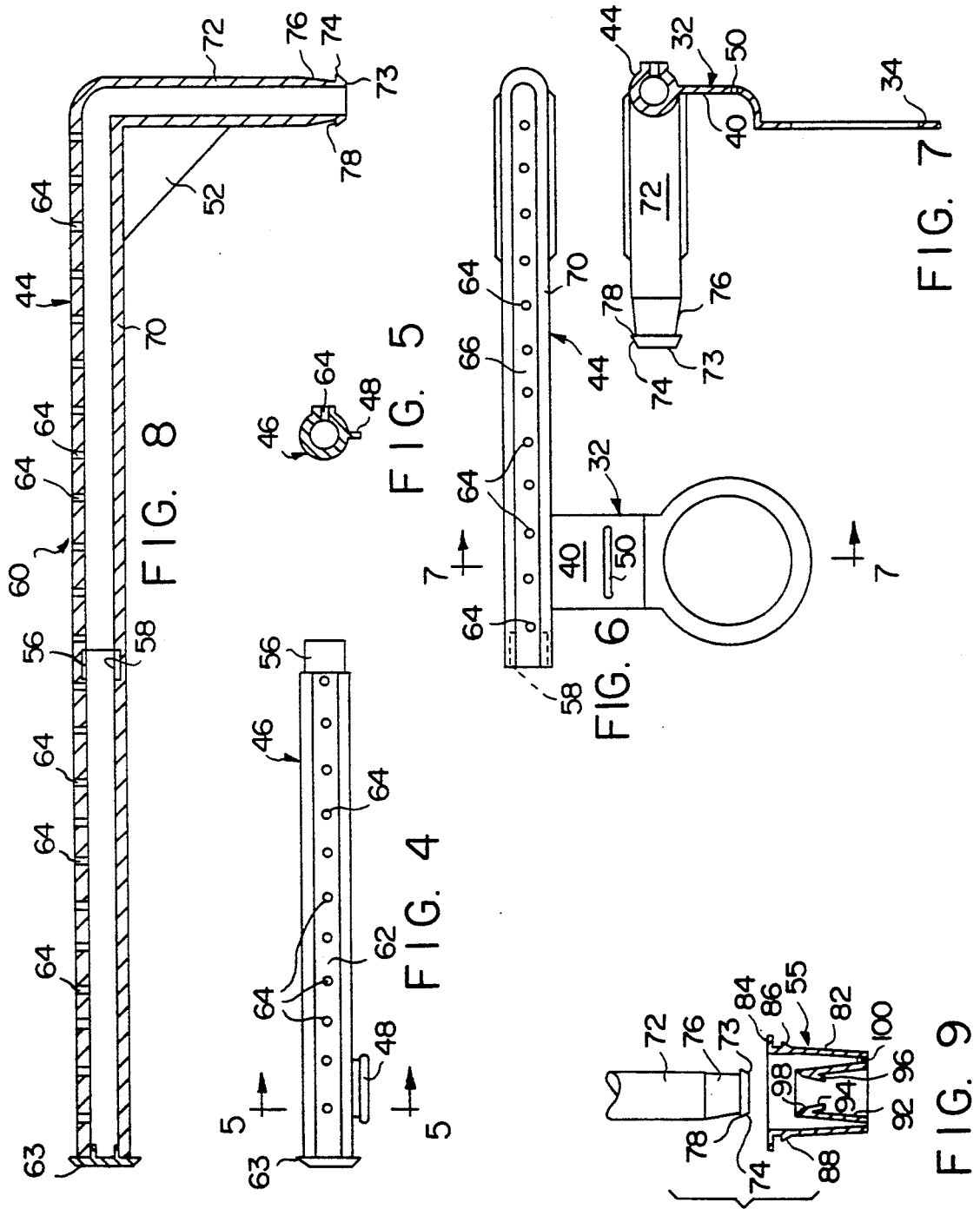

DISPENSING WAND AND COMBINATION OF DISPENSING WAND WITH CONTAINER

BACKGROUND OF THE INVENTION

1. Technical Field

The instant invention relates to a dispensing wand and to a combination of the dispensing wand with a container. More particularly, the instant invention relates to a dispensing wand structure and to the combination of that structure with a container for dispensing liquid from the container by gravity.

2. Background Art

Various liquid coating products can be applied by sprinkling the products onto surfaces to be treated by the products. For example, in treating wooden decks and other horizontal surfaces with preservatives, it is frequently sufficient to simply sprinkle the preservative onto the decks or surfaces. With liquids which readily penetrate wood, it is frequently not necessary to brush the liquid preservative into the wood.

Various other horizontal surfaces, such as driveways, lawns and gardens, floors, roofs, and a host of other surfaces, may from time to time require or benefit from the application of a liquid substance thereto. In each of these situations, it may be desirable to provide a device for sprinkling liquid from a container.

Many of the liquids which are used for various treatment purposes have been on the market for a number of years and are already packaged in familiar cans and containers. Since the technology and know-how for using these cans and containers is developed and since capital investment for continuing their use has been expended, it may be beneficial for everyone concerned to continue using the containers. One type of container which is frequently used for containing liquid products, such as wood preservatives and the like, are the rectangular "F-type" cans, in which products such as THOMPSON'S WATER SEAL are sold. Since the public is familiar with the product and can, changing the can might be of little benefit to either the seller or consumer. Accordingly, there is a need to provide a sprinkling dispenser for cans such as the THOMPSON'S WATER SEAL can which interfere only minimally with the geometry of the can as currently configured.

The patent literature includes a number of expired and older sprinkling dispensers. U.S. Pat. Nos. 3,650,440 and 3,997,119 to Gorniak and Oosterhof, respectively, are unexpired patents indicative of the state of the art. The Gorniak device is relatively complex, requiring a hose for attachment to a container and utilizing a wand of somewhat complex geometry. The device is not suitable with an F-type can. Likewise, the Oosterhof device is not readily adaptable for dispensing liquids from cans in that the Oosterhof device is configured for use with granulated solids.

The patent literature also includes a number of patents directed to sprinklers for use with containers. For example, U.S. Pat. No. 668,956 to Enyeart discloses a liquid dispenser in which liquid is dispensed through a straight wand with a plurality of holes. However, the wand of Enyeart is not configured so as to conveniently dispense liquid from an F-type can. U.S. Pat. Nos. 2,657,951; 3,746,200; and 3,834,594 are further indicative of the state of the sprinkling art and disclose relatively complex arrangements for sprinkling liquids, none of which is particularly adaptable to providing an effective sprinkling arrangement for F-type cans.

SUMMARY OF THE INVENTION

It is an object of the instant invention to provide a new and improved dispensing wand for dispensing liquid from a container.

In view of the aforementioned and other objects, the instant invention contemplates a dispenser useful for dispensing liquid from a container having a filling and dispensing neck, wherein the dispenser comprises an annular insert for placement within the neck of the container and an L-shaped tube having a dispensing leg and a retaining leg. The dispensing leg has a row of spaced holes through which liquid in the container is dispensed. The retaining leg is received within the annular insert. When the dispenser is in place within the container, the container is inverted to dispense liquid from the row of holes so as to fall in a vertically extending array as the container is moved in a horizontal direction to thereby sprinkle the area beneath the dispenser with the liquid. In a preferred embodiment, the L-shaped tube is divisible into first and second separable sections, which are packaged together for storing the sections proximate one another prior to utilizing the dispenser. Optionally, the same structure which is used to retain the sections proximate one another is also used to secure the sections to the can.

The instant invention further includes a combination of a container with an L-shaped dispensing wand, wherein the L-shaped dispensing wand is retained by an insert fitted into the neck of the container.

In a preferred embodiment of the combination, the L-shaped dispensing wand is initially divided into sections and attached to the outside of the container. Upon purchase, the L-shaped dispensing wand is assembled and inserted into the container for use. The dispenser and container provide a new and improved combination useful for sprinkling liquids from containers onto surfaces to be treated with the liquids.

BRIEF DESCRIPTION OF THE DRAWINGS

Various other objects, features, and attendant advantages of the present invention will be more fully appreciated as the same becomes better understood when considered in conjunction with the accompanying drawings, in which like reference characters designate the same or similar parts throughout the several views and wherein:

FIG. 4 is a bottom view of a straight segment of the dispensing wand;

FIG. 5 is a cross section taken adjacent the end of the tubular wand taken along lines 5—5 of FIG. 4;

FIG. 6 is a bottom view of an L-shaped segment of the tubular wand;

FIG. 7 is a cross section taken along lines 7—7 of FIG. 6;

FIG. 8 is a side cross section through the dispenser wand assembled for use;

FIG. 9 is a fragmented view showing the dispensing wand aligned with the insert for insertion therein;

DESCRIPTION OF THE PREFERRED EMBODIMENTS

Figure 1:
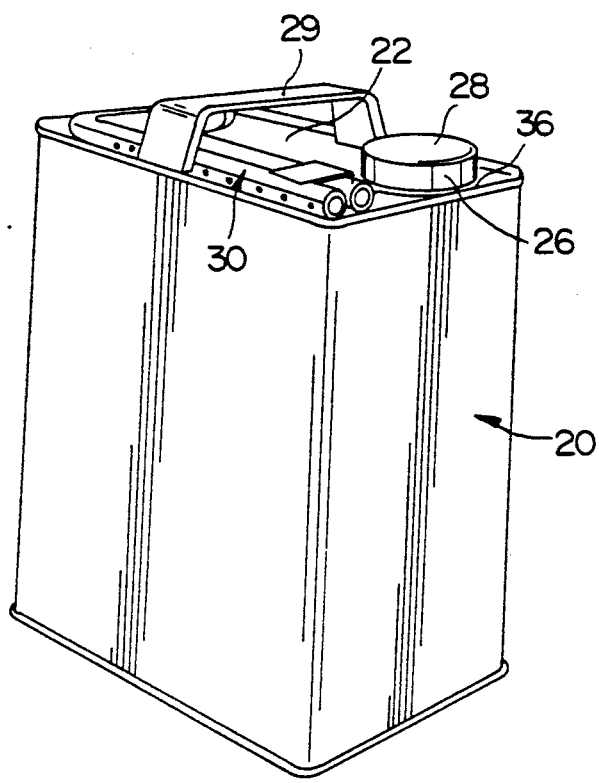
FIG. 1 is a perspective view of a container with a dispensing wand in accordance with the instant invention packaged therewith.

Referring now to FIG. 1, there is shown a rectangular metal container, designated generally by the numeral 20, for containing a liquid such as a wood preservative. The container 20 has a top wall 22 with an opening therethrough defined by an externally threaded neck 26. The mouth of the externally threaded neck is closed by a childproof cap 28 threaded onto the neck. The top wall 22 also includes a carrying handle 29.

Figure 2:
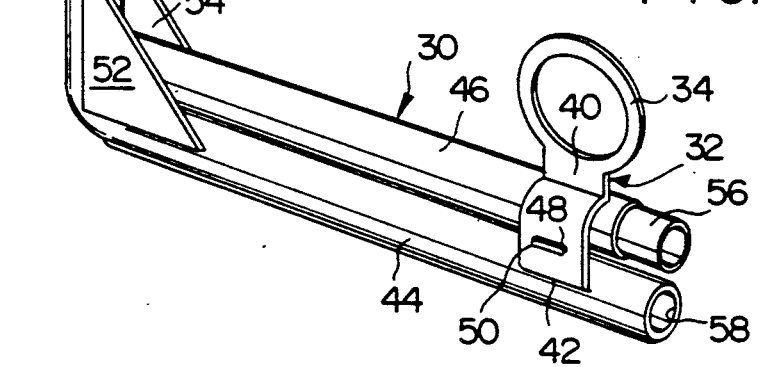
FIG. 2 is a perspective view of the packaged dispensing wand of FIG. 1, shown detached from the container.

Referring now to FIG. 2 in combination with FIG. 1, a dispensing wand packaging assembly, designated generally by the numeral 30, is secured to the container 20, for storage. In an optional embodiment, a web 32 has a ring 34 received around the neck 26 in a space 36 between the childproof cap 28 and the top wall 22 of the can 20. The packaging assembly lies against the top wall 22 of the can 20 and beneath the handle 29.

The web 32 includes a strap portion 40, which is formed integrally at a seam 42 with an L-shaped tube segment, designated generally by the numeral 44 (see also FIGS. 6 and 7), to form a first component of the dispensing wand packaging assembly 30. A straight tube segment, designated generally by the numeral 46, forming a second component of the dispensing wand assembly 30, is snap-fitted to a strap portion 40 of the web 32 by a tongue 48, which is received through a slot 50 in the strap portion (also see FIGS. 4–7). The web 32 joins the straight tube segment 46 and L-shaped tube segment 44 adjacent one end thereof, with the other ends of the tubes being held in proximity by a pair of flanges 52 and 54 molded integrally with the L-shaped tube 44 (also see FIGS. 9 and 10).

In lieu of the web 32, the components of the packing assembly 30 can be packaged in a plastic bag (not shown) or otherwise packaged together.

Figure 3:
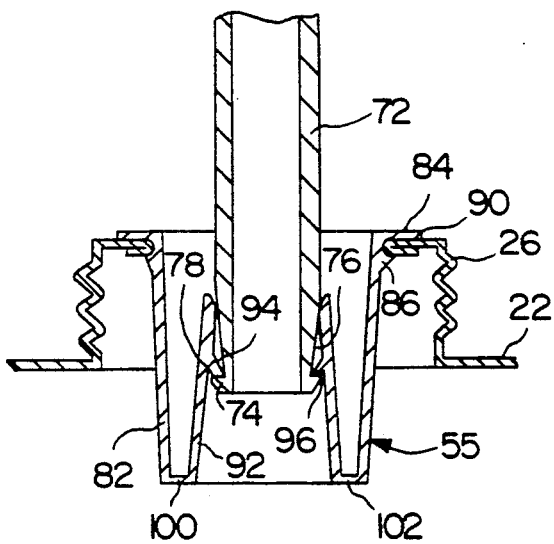
FIG. 3 is an enlarged side view illustrating how the dispensing wand is retained in an insert fitted within the neck of the container.

Referring now to FIG. 3, as will be further explained in detail hereinafter, when the components of the packaged wand assembly 30 are assembled for use, as is shown in FIG. 8, the assembled wand is retained in an insert, generally designated by the numeral 55, fitted within the threaded neck 26 of the can.

Referring now to FIGS. 4–8, in order to utilize the dispensing wand configured in the packaging assembly 30, the packaging assembly is disassembled by first disengaging the tongue 48 on the straight tube segment 46 from the slot 50 on the web 32 secured to the L-shaped tube segment 44. The straight tube segment 46 (FIGS. 4 and 5) can then be separated from the L-shaped tube segment 44 (FIGS. 6 and 7). The straight tube segment 46 has a small diameter portion 56, which is telescopically received in a slightly enlarged inner diameter portion 58 of the L-shaped tube segment 44 to form the assembly, designated generally by the numeral 60, shown in FIG. 8. A plug 63 is received in the end of straight tube segment 46 to close the end of the straight tube segment.

Figure 10:
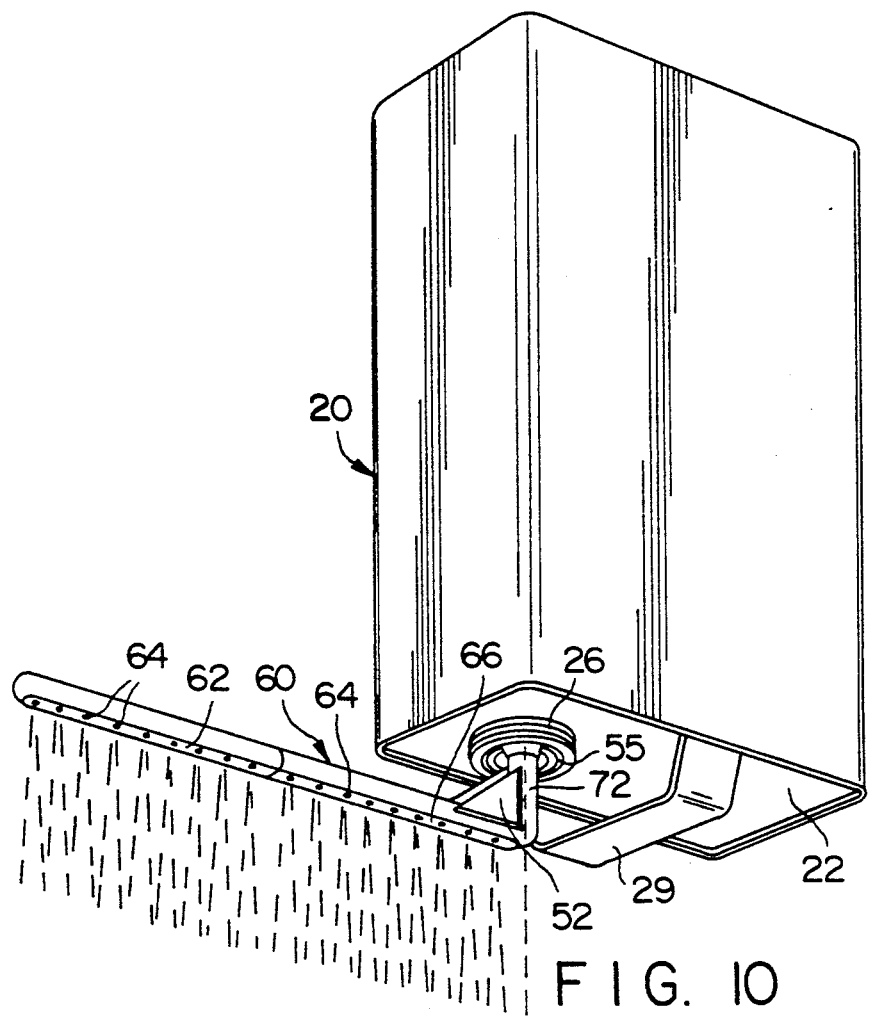
FIG. 10 is a perspective view showing the dispensing wand inserted in the container and being used to sprinkle liquid from the container.

The straight tube segment 46 has a single row 62 of holes 64 therein, which, when the straight tube segment is inserted into the L-shaped tube segment 44, are aligned with a single row 66 of holes 64 in the L-shaped tube segment to provide an array of outlet holes for dispensing liquid from the can 20 when the assembled wand 60 is inserted in the can 20, as is shown in FIGS. 3 and 10.

The L-shaped tube segment 44 has a first leg 70, which is axially aligned with the straight tube segment 46 to form a dispensing leg of the assembly 60, and a second leg 72, which extends at a right angle to the leg 70 to provide a retaining leg of the assembly. The leg 72 has a free end 73 with a circular detent 74 formed at the end of a necked down portion 76. The circular detent 74 presents a shoulder 78 which faces the first leg 70.

As is seen in FIGS. 3 and 9, the insert 55 is positioned within the threaded neck 26 of the container 20. The insert 55 comprises an outer sleeve 82 having an upper annular flange 84 and a circular detent 86 having a bevelled leading edge 88. When the insert 55 is inserted into the threaded neck 26 of the can 20, the flange 84 overlies the top surface of a lip 90 (FIG. 3), while the circular detent 86 underlies the lip. In practice, the insert 55 is inserted in the can 20 prior to putting on the cap 28 so that the insert 55 is within the neck 26 prior to retailing the can and its contents to consumers.

The insert 55 has an inner detent sleeve 92 positioned within the outer sleeve 82. The inner detent sleeve 92 has a circular detent 94 therein with a downwardly facing shoulder 96 and a bevelled inner surface 98. The inner sleeve 92 is joined to the outer sleeve 82 by a web 100. In order insert the assembled dispensing wand 60 of FIG. 8 into the neck 26 of the can 20, the leg 72 of the assembled dispensing wand is aligned with the insert, as shown in FIG. 9, and pushed home so that the inwardly facing circular detent 94 on the inner sleeve 92 engages above the outwardly facing circular detent 74 on the leg 72, as is shown in FIG. 3. Engagement between the bevelled inner surface 98 of the inner sleeve 92 and the bevelled portion 76 of leg 72 retains the wand 60 in place in the neck 26 of the can 20.

Referring now to FIG. 10, in order to dispense liquid from the can 20, the can is inverted with the assembled dispensing wand 60 extended therefrom, so that liquid flows from the can and is sprinkled through the array of aligned holes 64 along a horizontal, substantially straight line to fall in a vertical direction. As one walks along with the can 20, an area beneath the can is sprinkled with its contents, the area having an approximate width equal to the length of the assembled wand 60.

Figure 11:
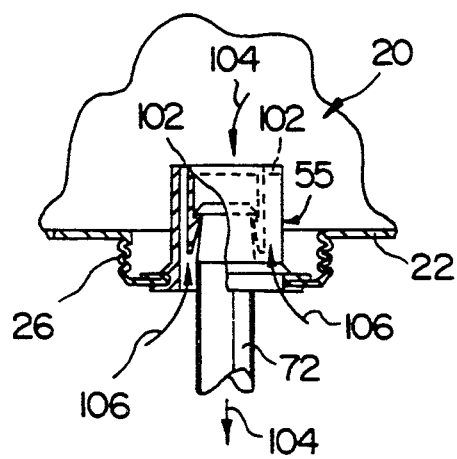
FIG. 11 is a fragmented view of the insert shown in FIG. 3, illustrating operation of vents formed in the insert.

Referring now to FIG. 11, it is seen that the insert 55 has a plurality of small holes 102 through the web 100 which joins the inner sleeve 92 to the outer sleeve 82. Typically, there may be four air vent holes 102 having a diameter of about 0.050", equally spaced in the web 100 around the inner sleeve 92. The inner diameter of the tubular wand 60 is about 0.50", with the air vent holes 64 (about 24 in number) having a diameter of 0.062" and being spaced about 0.480" apart. The leg 72 of the L-shaped segment has a length of about 2.710" so that the horizontally extending portion 70 of the L-shaped segment is about 2.3" to 2.5" from the air vent holes 102.

As a result of this arrangement, the atmospheric air pressure at the air vent holes 102 exceeds the fluid pressure head of liquid in the can 20 at the air vent holes as liquid 104 drains through the wand 60. Accordingly, air 106 enters the container 20 through the air vent holes and reduces the vacuum in the container as the liquid 104 leaves. The streams of air 106 entering the air vent holes 102 prevent liquid from leaking out of the air vent holes as the container 20 empties of liquid. The arrangement of FIG. 11 works equally well as the amount of liquid in the container 20 decreases. By providing the insert 55 with the aforementioned air vent holes 102, it is not necessary to provide a conventional vent tube which would extend almost to the bottom of the container 20.

The components of the assembly 60 and the insert 55 are preferably molded of polypropylene.

The aforedescribed arrangement provides a convenient way of rapidly coating a horizontal surface, such as, for example, a wooden deck, with a liquid material such as a preservative. In addition, the aforedescribed arrangement provides a convenient dispensing wand package for storing a sprinkler on a container, such as the F-type can 20.

From the foregoing description, one skilled in the art can easily ascertain the essential characteristics of this invention and, without departing from the spirit and scope thereof, can make various changes and modifications of the invention to adapt it to various usages and conditions.

The entire disclosure of all applications, patents, and publications cited herein are hereby incorporated by reference.

What is claimed is:

1. A dispenser useful for dispensing liquid from a container having a filling and dispensing neck, the dispenser comprising:
    an annular insert for placement within the neck of the container, and
    an L-shaped tube having a hollow dispensing leg and a hollow retaining leg, the dispensing leg having a row of spaced holes through which the liquid is dispensed and the retaining leg being received with the annular insert, whereby when the container is inverted the liquid is dispensed along a horizontal line from the row of holes to fall in a vertical direction, and as the container is moved in a horizontal direction an area beneath the dispenser is coated with the liquid.

2. The dispenser of claim 1, wherein the dispensing leg of the L-shaped tube is straight and divisible into first and second separable sections and wherein the dispenser further comprises means for storing the first and second sections proximate one another before the dispenser is utilized.

3. The dispenser of claim 2, wherein the means for storing the first and second sections comprises means for retaining the sections in parallel relation with respect to one another.

4. The dispenser of claim 3, wherein the retaining means includes a web fixed to one section and a tab to the other, the tab cooperating with the web to fasten the sections together.

5. The dispenser of claim 4, wherein the web includes means therein to attach the web and thus the dispenser to the container.

6. The dispenser of claim 5, wherein the web includes an annular portion for fitting around the neck of the can in cooperation with a cap for closing the can.

7. The dispenser of claim 6, wherein the web is positioned proximate one of the ends of the sections and an additional retaining means is positioned proximate the other ends of the sections.

8. The dispenser of claim 7, wherein the annular insert includes an internal sleeve and the retaining leg of the L-shaped tube includes an external surface for engagement by the sleeve and wherein, upon inserting the retaining leg into the internal sleeve, the L-shaped tube is retained within the container.

9. The dispenser of claim 1, wherein the insert further includes means for venting the container when the container is inverted.

10. The dispenser of claim 1, wherein the annular insert includes an internal sleeve and the retaining leg of the L-shaped tube includes an external sleeve for engagement by the sleeve and wherein, upon inserting the retaining leg into the internal sleeve, the L-shaped tube is retained within the container.

11. The dispenser of claim 10, wherein the insert further includes air vent holes therein to vent the container when the container is inverted.

12. The dispenser of claim 11, wherein the internal sleeve is secured to an external sleeve by a web with the air vent holes being in the web.

13. In combination, a container for containing a liquid and a dispensing wand for use with the container, the combination comprising:
    a neck for filling the container with the liquid and dispensing the liquid therefrom;
    a cap for closing the neck;
    an insert within the neck, the insert having means for retaining the dispensing wand in the neck upon removal of the cap;
    first and second legs comprising the dispensing wand, with the first leg extending substantially perpendicular to the second leg to provide the dispensing wand with an L-shape, the first leg having means thereon cooperating with the retaining means of the insert to secure the dispensing wand within the neck of the container, whereby the second leg extends substantially perpendicular to the neck of the container.

14. The combination of claim 13, further including means for securing the dispensing wand to the container inserted into the container prior to opening the container when the cap is in place on the neck.

15. The combination of claim 14, wherein the dispensing wand is separable into two portions and wherein the means for securing the dispensing wand to the container also secures the two portions temporarily to one another.

16. The combination of claim 13, further including air vent means incorporated into the insert.

17. The combination of claim 16, wherein the retaining means of the insert and the neck include means for snap fitting the insert into the neck.

18. The combination of claim 17, wherein the retaining means comprises an inner sleeve engaging one portion of the wand.

19. The combination of claim 18, wherein the dispensing wand and insert are both molded by polypropylene.

20. The combination of claim 13, wherein the container is a can, rectangular in cross section through both the height and width thereof, the can having a rectangular top surface with the neck positioned proximate one corner of the top surface.

* * * * *

UNITED STATES PATENT AND TRADEMARK OFFICE
CERTIFICATE OF CORRECTION

PATENT NO. : 5,115,951

DATED : May 26, 1992

INVENTOR(S) : Stuart LESLIE et al.

It is certified that error appears in the above-identified patent and that said Letters Patent is hereby corrected as shown below:

Claim 19; Col. 6; Line 60:

after "molded", insert -- of -- and delete (by)

Signed and Sealed this

Tenth Day of August, 1993

Attest:

MICHAEL K. KIRK

*Attesting Officer*     *Acting Commissioner of Patents and Trademarks*